US011228491B1

(12) United States Patent
Yakymovych et al.

(10) Patent No.: US 11,228,491 B1
(45) Date of Patent: Jan. 18, 2022

(54) SYSTEM AND METHOD FOR DISTRIBUTED CLUSTER CONFIGURATION MONITORING AND MANAGEMENT

(71) Applicant: FireEye, Inc., Milpitas, CA (US)

(72) Inventors: Alexey Yakymovych, Milpitas, CA (US); Alexander Otvagin, Campbell, CA (US)

(73) Assignee: FireEye Security Holdings US LLC, Milpitas, CA (US)

( * ) Notice: Subject to any disclaimer, the term of this patent is extended or adjusted under 35 U.S.C. 154(b) by 82 days.

(21) Appl. No.: 16/022,644

(22) Filed: Jun. 28, 2018

(51) Int. Cl.
*G06F 15/173* (2006.01)
*H04L 12/24* (2006.01)
*H04L 29/08* (2006.01)

(52) U.S. Cl.
CPC ...... *H04L 41/0853* (2013.01); *H04L 41/0816* (2013.01); *H04L 41/0873* (2013.01); *H04L 41/0893* (2013.01); *H04L 67/1097* (2013.01)

(58) Field of Classification Search
CPC ............. H04L 41/0853; H04L 67/1097; H04L 41/0893; H04L 41/0816; H04L 41/0873
See application file for complete search history.

(56) References Cited

U.S. PATENT DOCUMENTS

| 4,292,580 A | 9/1981 | Ott et al. |
|---|---|---|
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |

(Continued)

FOREIGN PATENT DOCUMENTS

| GB | 2439806 A | 1/2008 |
|---|---|---|
| GB | 2490431 A | 10/2012 |

(Continued)

OTHER PUBLICATIONS

Venezia, Paul, "NetDetector Captures Intrusions", InfoWorld Issue 27, ("Venezia"), (Jul. 14, 2003).

(Continued)

*Primary Examiner* — Cheikh T Ndiaye
(74) *Attorney, Agent, or Firm* — Rutan & Tucker, LLP

(57) ABSTRACT

A cyber-threat detection system that maintains consistency in local configurations of one or more computing nodes forming a cluster for cyber-threat detection is described. The system features a distributed data store for storage of at least a reference configuration and a management engine deployed within each computing node, including the first computing node and configured to obtain data associated with the reference configuration from the distributed data store, From such data, the management engine is configured to detect when the shared local configuration is non-compliant with the reference configuration, and upload information associated with the non-compliant shared local configuration into the distributed data store. Upon notification, the security administrator may initiate administrative controls to allow the non-compliant shared local configuration or modify the shared local configuration to be compliant with the reference configuration.

33 Claims, 7 Drawing Sheets

(56) References Cited

U.S. PATENT DOCUMENTS

| | | |
|---|---|---|
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,064,438 B1 * | 11/2011 | Croak ............... H04L 41/0853 370/356 |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Fuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |

(56) References Cited

U.S. PATENT DOCUMENTS

| | | | |
|---|---|---|---|
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,378,461 B1 * | 6/2016 | Chatterjee ............ G06F 9/5005 |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |

(56) References Cited

U.S. PATENT DOCUMENTS

| | | |
|---|---|---|
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0249916 A1* | 12/2004 | Graves ............... H04L 12/4675 709/223 |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |

(56) References Cited

U.S. PATENT DOCUMENTS

| | | |
|---|---|---|
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Ståhlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0066876 A1* | 3/2011 | Shannon ............ G06F 11/0793 714/4.11 |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0005318 A1* | 1/2012 | Beaty ................ H04L 41/0672 709/221 |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |

(56) References Cited

U.S. PATENT DOCUMENTS

| | | |
|---|---|---|
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351205 A1* | 11/2014 | Fennell .................. G06F 16/22 707/609 |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0095630 A1* | 4/2015 | Cote ..................... G06F 9/4401 713/1 |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0080204 A1* | 3/2016 | Mishra ................ H04L 41/0853 709/220 |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0197951 A1* | 7/2016 | Lietz .................... H04L 63/107 726/23 |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0124072 A1* | 5/2018 | Hamdi ................ G06F 11/3055 |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al.: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al., UCSB, Sep. 2007 https://www.cs.ucsb.edu/.about.chris/research/doc/esec07.sub.-mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r=990073, (Dec. 7, 2013).

(56) References Cited

OTHER PUBLICATIONS

Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K, (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10 1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard fora NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.-N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).

\* cited by examiner

SYSTEM AND METHOD FOR DISTRIBUTED CLUSTER CONFIGURATION MONITORING AND MANAGEMENT

FIELD

Embodiments of the disclosure relate to the field of cybersecurity and distributed computing. More specifically, one embodiment of the disclosure relates to a scalable, cyber-threat detection system managed to reduce operational errors caused by node misconfiguration and enhance cluster scalability.

GENERAL BACKGROUND

Network devices provide useful and necessary services that assist individuals in business and in their everyday lives. Given the growing dependence on these services, increased security measures have been undertaken to protect these network devices against cybersecurity attacks (hereinafter, "cyberattacks"). These cyberattacks may involve an attempt to gain access to content stored on one or more network devices for illicit (i.e., unauthorized) purposes or an attempt to adversely influence the operability of a network device. For instance, the cyberattack may be designed to alter functionality of a network device (e.g., ransomware), steal sensitive information or intellectual property, or harm information technology or other infrastructure.

One type of security measure that is growing in popularity involves the deployment of compute clusters. A "compute cluster" (hereinafter, referred to as "cluster") is a scalable cyber-threat detection architecture that includes multiple computing nodes that collectively perform analytics on received objects (e.g., data extracted from network traffic, files, etc.) to determine if these objects are malicious or non-malicious. Stated differently, the computing nodes are configured to analyze the received objects and determine whether such objects are part of a cyberattack (e.g., a likelihood of the object being associated with a cyberattack greater than a prescribed threshold). An example of a cluster is described in detail in U.S. patent application Ser. No. 15/283,128 entitled "Cluster Configuration Within A Scalable Malware Detection System," filed Sep. 30, 2016, the entire contents of which are incorporated by reference herein.

Clusters are central to large scale computing and cloud computing. However, for a cluster deployment, each computing node within a cluster is subject to operational errors caused by (i) third party disruptive activities (e.g., cyberattack), (ii) hardware or software failures, or (iii) misconfiguration that may be caused by a failed installation or an errand reconfiguration of a computing node, a failed or accidental software update, or the like. These operational errors may lead to inconsistent behavior of the cluster, and thus, depending on which computing node is handling an analysis of an object, the cluster may provide unreliable or inconsistent analytic results.

In some conventional implementations, cyber-threat detection systems are configured with a centralized cluster management system that periodically communicates directly with each computing node to detect operational errors and prevent unreliable cluster operability caused by configuration mishaps. However, the use of a centralized management system limits scalability, as throughput issues arise as the number of computing nodes within the cluster increase. Additionally, conventional cyber-threat detection systems typically require the configuration and/or reconfiguration of computer nodes in a cluster to be performed through direct communications with the central cluster management system, limiting cluster management to a single point of failure.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

I. Overview

Figure 1:
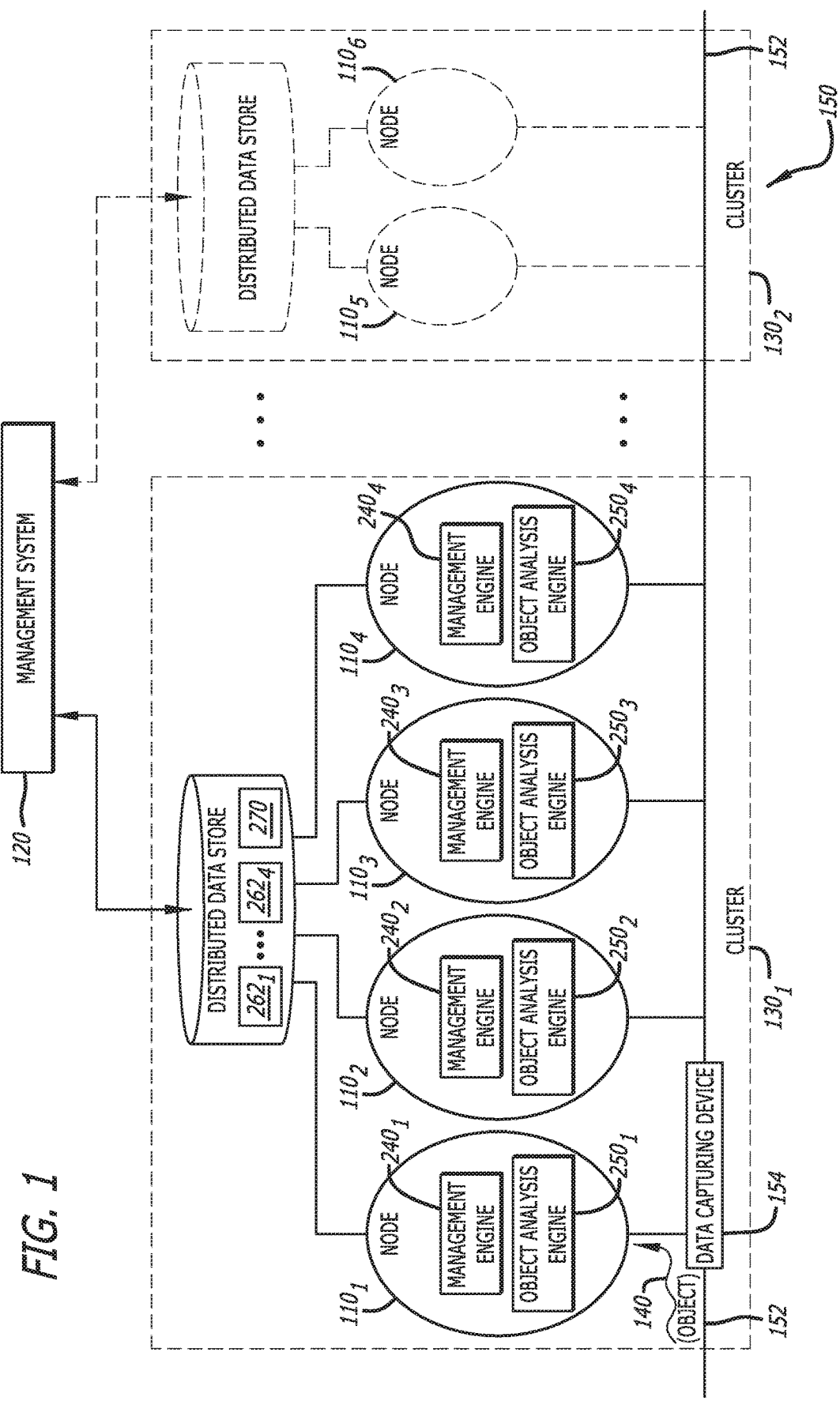
FIG. 1 is a block diagram of an exemplary embodiment of a cluster-based cyber-threat detection system including a configuration management framework.

Embodiments of the present disclosure generally relate to a distributed, configuration management framework that relies on interoperating management engines deployed within the computing nodes of the cluster to reduce operational errors, increase scalability, and ease cluster management. The operability of each computing node is based, at least in part, on its local configuration; namely, information stored within the computing node that is directed to properties (e.g., settings, parameters, permissions, etc.) that control operability of the computing node. The local configuration may include (i) "shared local configuration," namely one or more portions of the local configuration data each directed to a different functionality that is commonly shared by computing nodes operating within the same cluster; and (ii) "private local configuration," namely a portion of the local configuration data that is specific to the particular computing node (e.g., common properties). Besides the information associated with the common properties described above, the shared local configuration may further include metadata directed to the properties, such as the monitoring method of the properties, configuration values assigned to different properties, and the method utilized in modifying the configuration values.

The configuration management framework reduces operational errors that may be experienced by the cyber-threat detection system through the installation of a management engine into each computing node capable of forming and/or joining with a cluster. Each management engine within a computing node is configured to periodically or aperiodically analyze the shared local configuration for that computing node and detect when the shared local configuration is non-compliant with a reference (or golden) configuration. Non-compliance may be detected when information (e.g., configuration values, etc.) within the shared local configuration (hereinafter, "shared local configuration data") is inconsistent with corresponding information within the reference configuration (hereinafter, "reference configuration data"). This level of inconsistency may be absolute without allowing any discrepancies between the shared local configuration and the reference data may allow certain tolerances (e.g., allowable prescribed differences) that may be set based on property type.

It is contemplated, however, as another embodiment, that the level of inconsistency between shared local configuration data and the reference data may allow certain tolerances (e.g., the tolerance may be dependent on property type), and thus, a difference in configuration data may not be deemed "inconsistent." However, it is further contemplated that a difference in other properties (e.g., certain permissions) maintained in the shared local configuration and the reference configuration may lead to a non-compliance finding.

As described below, both the shared local configuration and the reference configuration are changeable, so the description may referred to certain states of the configurations as "current" or "next" shared local (or reference) configurations based on their current or modified (next) state.

Representing the current shared local configuration expected for each of the computing nodes within the same cluster, the reference configuration may include (i) a set (one or more) of properties of the computing node to be monitored (e.g., what logic for threat detection analytics is enabled or disabled, Operating System "OS" type, etc.); (ii) the method by which the properties are monitored (e.g., read/write monitoring, read only monitoring, etc.); (iii) the value assigned to each property (e.g., integer value, string value, etc.); and/or (iv) the method for modifying the configuration value assigned to each of the properties (e.g., call, function, Application Programming Interface "API", etc.). Herein, the reference configuration may be stored in a distributed (shared) data store and may be configurable. For one embodiment, the distributed data store may be memory contained within each computing node collectively operating as the distributed data store (e.g., each computing node contains a portion of the data in the distributed data store but the distributed data store appears via a user interface as a single storage). For another embodiment, the distributed data store may be a separate, addressable memory that is shared between or segmented and allocated to the computing nodes forming a cluster.

More specifically, according to one embodiment of the disclosure, each management engine is adapted to (i) monitor the shared local configuration of its computing node, (ii) identify whether any shared local configuration data is non-compliant (e.g., inconsistent) with corresponding reference configuration data, and (iii) report the detected non-compliance being a configuration violation for a particular cluster. In some cases, the configuration violation, caused by a deviation from the reference configuration, would result in a false positive or false negative verdict (determination) or increased latency in detection of a cyberattack.

The reporting of the configuration violation may be accomplished by the management engine uploading the non-compliant, shared local configuration data (or metadata representing the non-compliant, shared local configuration data) into the distributed data store of the particular cluster. More specifically, according to one embodiment of the disclosure, a management engine of a computing node operating as a configuration lead node (e.g., the first computing node to join the cluster or otherwise an automatically elect or determined node of the cluster) generates an inconsistency report directed to its own configuration compliance or non-compliance with the reference configuration (e.g., node health) as well as to configuration inconsistencies for the entire cluster realized by aggregating the shared local configuration data for all of the computing nodes. Each management engine of the other computing nodes generates an inconsistency report for itself (e.g., node health). The configuration lead node makes the cluster-wide inconsistency report available to the management system, which makes the inconsistency report available to a security administrator.

Using a predefined API (hereinafter, "cluster management API"), the management system may conduct a polling operation to retrieve cluster status information (e.g., name, health, size, etc.) along with status information for the computing nodes within the particular cluster (e.g., node name, node health, network address of the node, etc.). The status information for the non-compliant computing node may identify a configuration violation and provide an IT administrator (e.g., a security administrator) with access to the non-compliant, shared local configuration data via an administrative portal (pulling data). Alternatively, upon detecting a configuration violation, the management system initiates transmission of the non-compliant, shared local configuration data via the portal (pushing data). Herein, the security administrator may be an analyst or an automated system that relies on preconfigured rule sets, machine learning models, or other artificial intelligence schemes (e.g., artificial neural networks, etc.) to determine how to handle a configuration violation through rule enforcement, remediation using repair instructions to return the shared local configuration back to a prior state that is in compliance with the reference configuration, leave the cluster, or the like.

The configuration management framework further reduces operational errors by at least management engine for the first computing node (serving as the configuration lead node) being adapted to (i) acquire shared local configurations for other computing nodes within the cluster, (ii) identify whether the shared local configuration of another computing node (e.g., a second computing node) is non-compliant with (e.g., differs from) the reference configuration, and (iii) report detected non-compliance by the second computing node. The reporting of non-compliance by the second computing node may be accomplished as described above, namely the first computing node uploading the detected, non-compliant shared local configuration data for the second computing node (or metadata representing the non-compliant shared local configuration data) into the distributed data store. This non-compliant, shared local configuration data (or representative metadata) may be appended to the shared local configuration data stored within the distributed data store. Access to the non-compliant shared local configuration data (or representative metadata) is made available to the security administrator via a push or pull data delivery scheme, as described above.

Responsive to determining that the shared local configuration is non-compliant, the first computing node may execute repair instructions that returns the shared local configuration back to a prior state that is in compliance with the reference configuration. Alternatively, in other cases, the first computing node may issue a leave command to remove itself from the cluster. The issuance of the leave command may depend on the degree of non-compliance and/or the non-compliant properties.

It is noted that, rather than the first computing node requesting removal of itself or another computing node, the management system may issue commands for such removal and change the listing of computing nodes forming the cluster to account for misconfigured computing nodes. Also, in some cases, the misconfiguration may be due to a security breach where the computing node goes rogue (misconfigured) and removal of an untrusted computing node is desired for the health of the cluster and the enterprise network as a whole.

The distributed, configuration management framework enhances scalability of the cluster by the management engines using a cascading, "multicast" communication scheme. One type of "multicast" communication scheme relies a Gossip communication protocol. In lieu of relying on a single point (e.g., a centralized management system) in managing configurations for each computing node within a cluster, the distributed, configuration management framework disseminates messages between neighboring computing nodes. This multicast communication scheme allows the security administrator, via the management system, to upload intended updates and/or modifications to the reference configuration within the distributed data store. Alternatively, the reference configuration updates may be detected computing nodes including logic that monitors for changes in internal services provided by a computing node (e.g., local configuration changes after successful testing at a computing node, etc.) and any intended changes in service may cause an update to the reference configuration within the distributed data store. Thereafter, the updating of the reference configuration may cause other computing nodes, over time, to detect that their shared local configuration is non-compliant and modify their shared local configuration accordingly.

II. Terminology

In the following description, certain terminology is used to describe features of the invention. In certain situations, terms "logic," "engine," "component" and "client" may be representative of hardware, firmware and/or software that is configured to perform one or more functions. As hardware, logic (or engine or component or client) may include circuitry having data processing or storage functionality. Examples of such circuitry may include, but are not limited or restricted to a processor such as a microprocessor, one or more processor cores, a programmable gate array, a microcontroller, an application specific integrated circuit, a digital signal processor (DSP), field-programmable gate array (FPGA), wireless receiver, transmitter and/or transceiver circuitry, combinatorial logic, or any other hardware element with data processing capability. The circuitry may include memory operating as non-persistent or persistent storage.

Logic (or engine or component or client) may be software in the form of one or more software modules. The software modules may be executable code in the form of an executable application, an API, a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

A "network device" generally refers to either a physical electronic device featuring data processing and/or network connection functionality or a virtual electronic device being software that virtualizes certain functionality of the physical network device. Examples of a network device may include, but are not limited or restricted to, a server, a mobile phone, a computer, a standalone cybersecurity appliance, a network adapter, an industrial controller, an intermediary communication device (e.g., router, firewall, etc.), a virtual machine, or any other virtualized resource.

The term "object" generally relates to content having a logical structure or organization that enables it to be classified during threat analysis. The content may include an executable (e.g., an application, program, code segment, a script, dynamic link library "dll" or any file in a format that can be directly executed by a computer such as a file with an ".exe" extension, etc.), a non-executable (e.g., a storage file; any document such as a Portable Document Format "PDF" document; a word processing document such as Word® document; an electronic mail "email" message, web page, etc.), or simply a collection of related data. The object may be retrieved from information in transit (e.g., a plurality of packets) or information at rest (e.g., data bytes from a storage medium).

The terms "message" generally refers to information placed in a prescribed format and transmitted in accordance with a suitable delivery protocol or information provided to (or made available from) a logical data structure such as a prescribed API in order to perform a prescribed operation. Examples of a delivery protocol include, but are not limited or restricted to Gossip protocol, User Datagram Protocol (UDP); or the like. Hence, each message may be in the form of one or more packets, frame, instruction such as a command, or any other series of bits having the prescribed, structured format.

The term "computerized" generally represents that any corresponding operations are conducted by hardware in combination with software and/or firmware. In certain instances, the terms "compare," "comparing," "comparison," or other tenses thereof generally mean determining if a match (e.g., identical or a prescribed level of correlation) is achieved.

The term "transmission medium" generally refers to a physical or logical communication link (or path) between two or more network devices. For instance, as a physical communication path, wired interconnects in the form of electrical wiring, optical fiber, cable, or bus trace may be used. For a wireless interconnect, wireless transmitter/receiver logic supporting infrared or radio frequency (RF) transmissions may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. Distributed, Configuration Management Framework

Referring to FIG. 1, an exemplary block diagram of a cyber-threat detection system 100 is shown. The threat detection system 100 includes one or more computing nodes $110_1$-$110_M$ (M≥1), each computing node $110_1, \ldots,$ or $110_M$ is communicatively coupled to a management system 120. As shown as an illustrative example, selected subsets of the computing nodes $110_1$-$110_6$ may be grouped to form one or more clusters $130_1$-$130_N$ (M≥N≥1, e.g., N=2), where each of the clusters $130_1$-$130_2$ performs threat detection analytics on objects received for analysis. The threat detection analytics may be used to determine the likelihood (e.g., probability) of a received object 140 being malicious and/or part of a cyberattack based on behavioral analyses of the received object 140 (or of components processing the received object 140) during execution of the received object 140 and/or analyses of the content of the received object 140 without execution of the received object.

More specifically, according to one embodiment of the disclosure, a "computing node" (e.g., any of the computing node $110_1$-$110_6$) may be implemented as a physical network device (e.g., server, computer, etc.) configured to analyze received objects 140 and determine whether the received objects 140 are part of a cyberattack. Alternatively, the computing node may be implemented as a virtual network device (e.g., software adapted to perform the functionality of the computing node), or a combination thereof. To analyze a received object 140, one of the computing nodes $110_1$-$110_4$ (e.g., the first computing node $110_1$) within a selected cluster (e.g., first cluster $130_1$) is selected for conducting an in-depth analysis of the received object 140 based on a variety of factors—processing capability of an object analysis engine $250_1$ (see FIG. 2) deployed within the first computing node $110_1$ (described below) and/or software profile of the first computing node $110_1$ for example. Otherwise, such processing may be handled by a different computing node $110_2$-$110_4$ within the cluster $130_1$.

As an illustrative example, the first cluster $130_1$ is formed to include a first plurality of computing nodes $110_1$-$110_4$ while a second cluster $130_2$ is formed to include a second plurality of computing nodes $110_5$-$110_6$. Besides threat analytics, each computing node within a cluster (e.g., cluster $130_1$) may subscribe to a configuration service supported by the configuration management framework (hereinafter, "configuration management service") to monitor and maintain the local configuration of these computing nodes. For clarity sake, the following description may focus on the architecture and operations of one of the computing node $110_1$-$110_6$ within a corresponding cluster that subscribes to the configuration management service, such as the first computing node $110_1$ within the first cluster $130_1$ for example, when describing the formation of the cluster and management of the computing node configurations within a cluster. It is contemplated, however, that the other computing nodes $110_2$-$110_6$ may feature the same or substantially similar architecture as the first computing node $110_1$ and perform similar operations to support the cluster services (e.g., object analytics, etc.) offered by their cluster $130_1$ or $130_2$.

Figure 2:
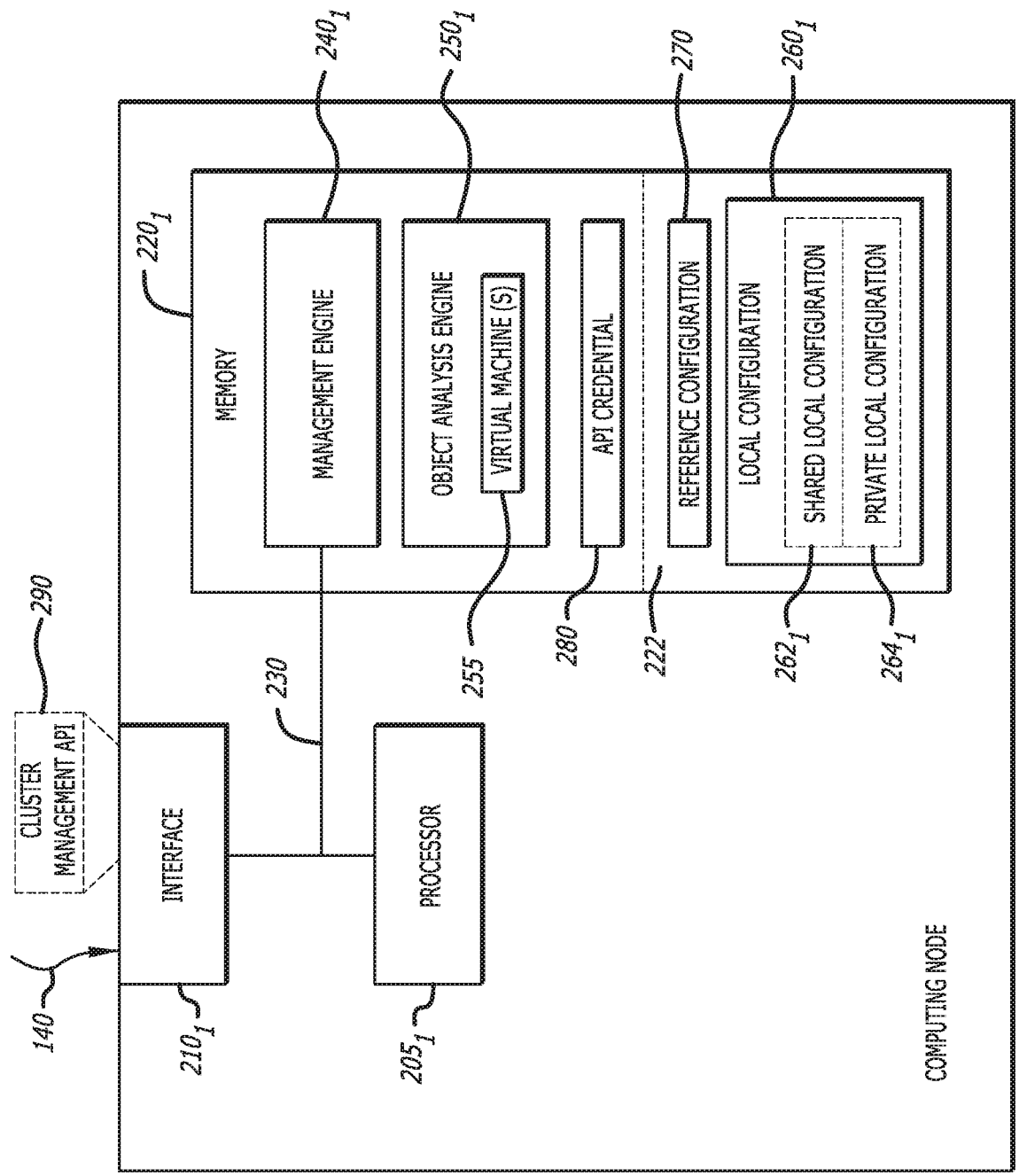
FIG. 2 is a block diagram of an exemplary embodiment of a computing node of a cluster forming part of the cyber-threat detection system.

Referring now to FIG. 2, each of the first plurality of computing nodes $110_1$-$110_4$ forming the cluster $130_1$, such as computing node $110_1$ for example, may include one or more processors $205_1$, one or more interfaces $210_1$ and a memory $220_1$ communicatively coupled together by one or more transmission mediums 230. The interface(s) $210_1$ may operate as a network interface configured to receive the object 140 as well as communications from the management system 120, as described below. The computing nodes $110_1$-$110_4$ may be deployed as physical network devices, although any or all of first plurality of computing nodes $110_1$-$110_4$ forming the cluster $130_1$ may be virtualized and implemented as software modules that communicate with each other via a selected communication protocol.

For this illustrative example, the memory $220_1$ may include a management engine $240_1$, an object analysis engine $250_1$, a local configuration $260_1$, a reference (or golden) configuration 270, and/or credentials 280 to access a predefined API (hereinafter, "cluster management API 290). The cluster management API 290 is structured to receive executable commands to form a cluster (create cluster) or destroy the formation of a cluster (delete cluster).

Herein, the local configuration $260_1$ includes information associated with the setting, monitoring and/or modifying of properties that control operability of the first computing node $110_1$. The local configuration $260_1$ features (i) shared local configuration $262_1$ representing one or more portions of configuration data directed to different functionality that is commonly shared by computing nodes operating within the same cluster $130_1$ and (ii) private local configuration $264_1$ representing configuration information that is specific to the particular computing node. The shared local configuration $262_1$ is stored within a portion 222 of the memory $220_1$ with shared access by any of the computing nodes $110_1$-$110_4$ as well as the management system 120. This shared memory 222 operates as part of a "distributed data store," where the logical representation of the shared access is illustrated in FIG. 1. The shared local configuration $262_1$ is monitored by the management engine $240_1$ for non-compliance with the reference configuration 270, which is the expected configuration for each of the computing nodes $110_1$-$110_4$ within the cluster $130_1$.

As further shown in FIG. 2, the object analysis engine $250_1$ for illustrative purposes includes logic that is capable of conducting an in-depth analysis of the received object 140 for cyber-security threats. For example, the object analysis engine $250_1$ may include one or more virtual machines (hereinafter, "VM(s)" 255). Each of the VM(s) 255 may be provisioned with different guest image bundles that include a plurality of software profiles as represented by a different type of operating system (OS), a different type and/or version of application program. Hence, the operability of computing node $110_1$, in particular the object analysis engine $250_1$ deployed therein, is at least partially based on its local configuration $260_1$.

Referring to both FIGS. 1-2, the management engine $240_1$, when executed, is capable of evaluating whether the shared local configuration $262_1$ is compliant (e.g., consistent) with the reference configuration 270. It is noted that, for the newly formed cluster $130_1$, the shared local configuration $262_1$, being a portion of the local configuration $260_1$ of the first computing node $110_1$, may initially operate as the reference configuration 270 for the cluster $130_1$. During operation, the shared local configuration $262_1$ and the reference configuration 270 may be altered.

Also, the management engine $240_1$ is capable of evaluating, potentially through an automatically elected, configuration lead node, whether shared local configurations $262_2$-$262_4$ of other computing nodes $110_2$-$110_4$ within its cluster $130_1$ are compliant with the reference configuration 270. Compliance between the shared local configurations $262_1$-$262_4$ and the reference configuration 270 improves correlation between results produced from object analysis engines $250_1$-$250_4$ within the computing nodes $110_1$-$110_4$ on identical or similar received objects 140. The management engine $240_1$ is further responsible for inter-operations with one or more "neighboring" computing (e.g., nodes $110_2$-$110_3$), as described below.

Referring back to FIG. 1, focusing on the operations of the first cluster $130_1$ for clarity sake, the computing nodes $110_1$-$110_4$ within the first cluster $130_1$ may be located within the same sub-network (not routing between nodes). As shown, the computing nodes $110_1$-$110_4$ may be positioned at various locations on a transmission medium 152 that is part of a network 150 (e.g., connected at various ingress points on a wired network or positioned at various locations for receipt of wireless transmissions) and receive objects included within traffic propagating over the transmission medium 152. The "traffic" may include an electrical transmission of certain objects, such as files, email messages, executables, or the like. For instance, each computing nodes $110_1$, . . . , or $110_4$ may be implemented either as a standalone network device, as logic implemented within a network device, logic integrated into a firewall, or as software running on a network device.

More specifically, according to one embodiment of the disclosure, the first computing node $110_1$ may be implemented as a network device (or installed within a network device) that is coupled to the transmission medium 152 directly (not shown) or is communicatively coupled with the transmission medium 152 via an interface 154 operating as a data capturing device. According to this embodiment, the data capturing device 154 is configured to receive the incoming data and subsequently process the incoming data, as described below. For instance, the data capturing device 154 may operate as a network tap (in some embodiments with mirroring capability) that provides at least one or more objects (or copies thereof) extracted from data traffic propagating over the transmission medium 152. Alternatively, although not shown, the first computing node $110_1$ may be configured to receive files or other objects automatically (or on command), accessed from a storage system.

As further shown in FIGS. 1-2, the computing nodes $110_1$-$110_4$ may be positioned in close proximity, perhaps within a server farm or facility. As described above, it is contemplated that any or all of clusters $130_1$-$130_N$ (e.g., first cluster $130_1$ and/or second cluster $130_2$) may be virtualized and implemented as software, where the computing nodes $110_1$-$110_4$ are software modules that communicate with each other via any selected communication protocol (e.g., Gossip or other UDP-based protocol, etc.). For this virtualized deployment, one or more of the computing nodes within a cluster (e.g., the first computing node $110_1$ within the first cluster $130_1$) may be implemented entirely as software for uploading into a network device and operating in cooperation with an operating system running on the network device. For this implementation, a software-based computing node is configured to operate in a manner that is substantially similar or identical to a hardware-based computing node.

Additionally according to this embodiment of the disclosure, with respect to the first cluster $130_1$, each of the computing nodes $110_1$-$110_4$ is communicatively coupled to a distributed data store 170. The distributed data store 170 may be deployed as a separate data store to store at least the shared local configuration $262_1$-$262_4$ and the reference configuration 270, which are accessible by the computing nodes $110_1$-$110_4$. Alternatively, as shown, the distributed data store 170 may be provided as a collection of synchronized memories within the computing nodes $110_1$-$110_4$ (e.g., data stores that collectively form distributed data store 170). Hence, the portion of memory (data store 222 may be configured to individually store the shared local configuration $262_1$ for computing node $110_1$ along with the reference configuration 270. The other synchronized data stores may be configured to individually store their corresponding shared local configurations $262_2$-$262_4$ for computing nodes $110_2$-$110_4$ along with the reference configuration 270.

Referring still to FIG. 1, the management system 120 assists in formation of each clusters $130_1$, . . . , or $130_N$ (e.g., cluster $130_1$), and after such formation, the management system 120 initiates operations to confirm shared local configuration consistency between the computing nodes $110_1$-$110_4$. Also, the management system 120 maintains communications with the cluster $130_1$ in support of cluster-based services. Stated differently, after formation of the cluster $130_1$, the management system 120 is configured to discontinue communications with the computing nodes $110_1$-$110_4$ on a per node basis; instead, the management system 120 communicates with the cluster $130_1$ on a per cluster basis.

Figure 3:
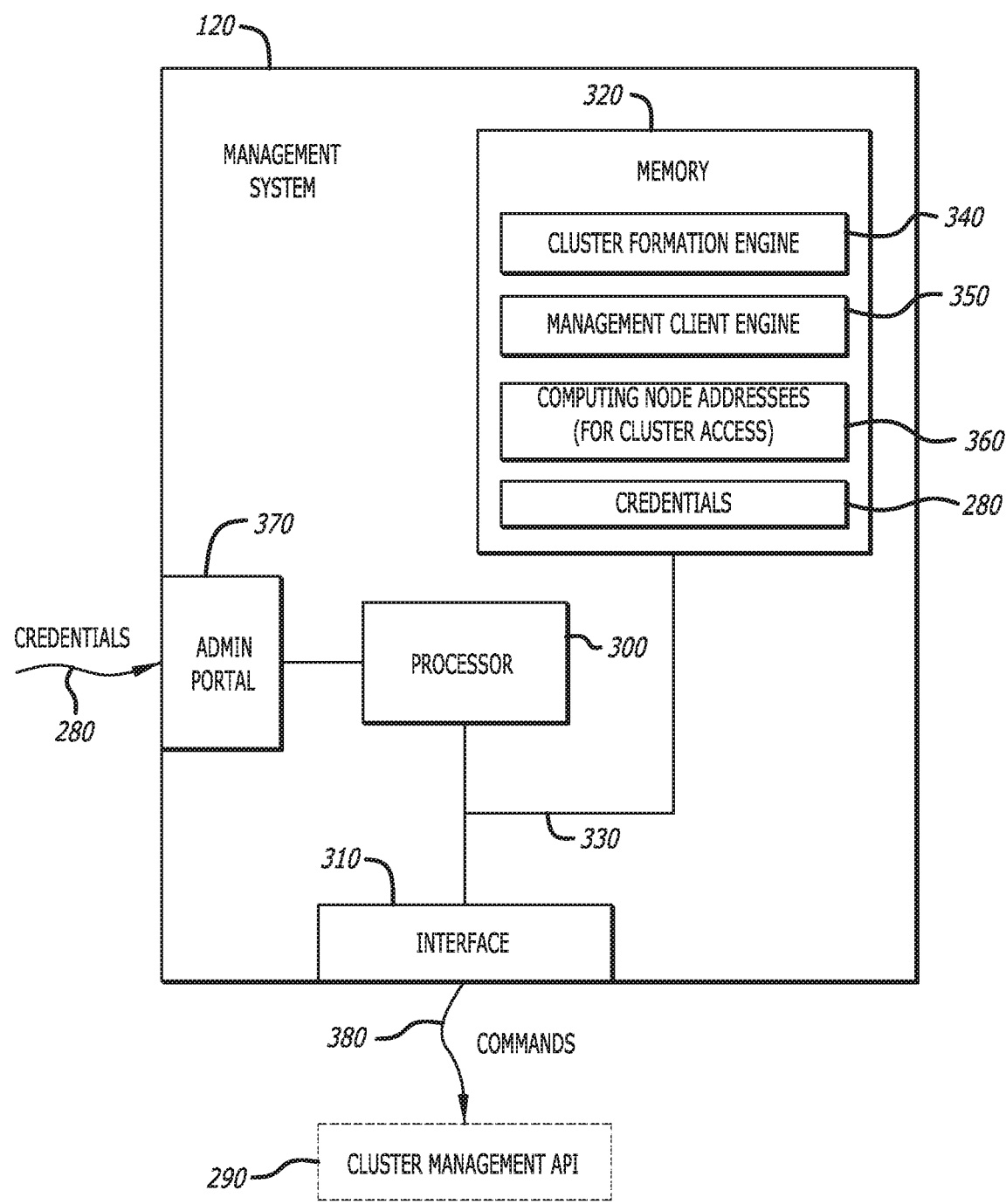
FIG. 3 is a block diagram of an exemplary embodiment of the management system operating with the configuration management framework deployed in the cyber-threat detection system.

Referring now to FIG. 3, the management system 120 may include one or more processors 300, one or more interfaces 310 and a memory 320, which are communicatively coupled together by one or more transmission mediums 330. The management system 120 may be deployed as a type of physical network device, although the management system 120 may be virtualized and implemented as software modules that communicate with one or more clusters (e.g., cluster $130_1$ and $130_2$) via a selected communication protocol.

For this illustrative example, the interface(s) 310 may operate as a network interface configured to access one or more distributed data stores (e.g., distributed data store 170) maintained within the clusters (e.g., clusters $130_1$-$130_2$) managed by the management system 120. The processor 300 is a multi-purpose, processing component as described above, which is configured to execute logic, such as a cluster formation engine 340 and a management client engine 350 for example, stored within non-transitory storage medium operating as the memory 320. Herein, the memory 320 may further store cluster-based information related to how to access a particular cluster, such a data store including a listing 360 of computing node addresses associated with a particular cluster and credentials 280 to access the cluster management API 290 (hereinafter, "API credentials" 280").

Referring to FIGS. 1-3, the cluster formation engine 340 is responsible for assisting in the formation of clusters, as described below. According to one embodiment of the disclosure, the cluster formation engine 340 receives a request for cluster creation from an authorized user via an administrative portal 370. The cluster creation request may include the API credentials 280, which may be subsequently stored within the management system 120 as shown above. Upon receipt of the cluster creation request via the administrative portal 370, the cluster formation engine 340 may initiate commands 380 to the cluster management API 290 to form and/or modify the computing node composition of the clusters $130_1$-$130_2$.

The management client engine 350 is adapted to acquire configuration status (e.g., presence of any metadata identifying non-compliance of a shared local configuration with the reference configuration) from the distributed data stores maintained within the managed cluster(s). In particular, according to one embodiment of the disclosure, the management client engine 350 is responsible for periodically or aperiodically polling the distributed data stores (e.g., distributed data store 170 of FIG. 1) for configuration status. During this polling operation, responsive to detecting a configuration violation, the management client engine 350 provides a security administrator with access to data representative of the non-compliant configuration parameter(s) via the administrative portal 370 (pulling data). Alternatively, responsive to detecting a configuration violation, the management client engine 350 may initiate transmissions of data (e.g., alert or report) identifying the configuration violation (e.g., cluster ID, computing node name and/or IP address, inconsistent configuration parameters, etc.) to the security administrator via the administrative portal 370 (pushing data).

As an optional function, the management client engine 350 may attempt to remediate non-compliance. As an illustrative example, upon detecting the shared local configuration $262_1$ of the first computing node $110_1$ is non-compliant with the reference configuration 270, the management client engine 350 may retrieve repair instructions (not shown) from the distributed data store 170. Thereafter, the management client engine 350 may execute the repair instructions to overwrite the non-compliant data and return the shared local configuration $262_1$ into compliance with the reference configuration 270.

Additionally, the management client engine 350 is adapted to initiate updates to the reference configuration 270 of FIGS. 1-2 within a supported cluster (e.g., reference configuration 270 within the cluster $130_1$). Such updates would cause each of the computing nodes $110_1$-$110_4$ within the cluster $130_1$ to update its shared local configuration $262_1$-$262_4$, respectively. More specifically, upon updating the reference configuration 270, such as changing a setting, permission or a parameter (e.g., cluster ID, computing node, IP address, etc.), the management engines $240_1$-$240_4$ for each of the computing nodes $110_1$-$110_4$, during their periodic or aperiodic evaluation, would detect that the shared local configurations $262_1$-$262_4$ for the computing nodes $110_1$-$110_4$ are non-compliant with the reference configuration 270. Depending on the remediation procedure selected, the management engines $240_1$-$240_4$ may alter the local configuration services to adjust their setting, permission or parameter to be consistent with the updates in the reference configuration 270. Alternatively, the management engines $240_1$-$240_4$ may prompt the non-compliant computing nodes $110_1$-$110_4$ to leave the cluster $130_1$, as described below and illustrated in FIGS. 6A-6B.

Although not illustrated in detail, some or all of the logic forming the management system 120 may be located at an enterprise's premises (e.g., located as any part of the enterprise's network infrastructure whether located at a single facility utilized by the enterprise or at a plurality of facilities). As an alternative embodiment, some or all of the management system 120 may be located outside the enterprise's network infrastructure, generally referred to as public or private cloud-based services that may be hosted by a cybersecurity provider or another entity separate from the enterprise (service customer). Obtaining a high degree of deployment flexibility, embodiments of the management system 120 may also feature a "hybrid" solution, where some logic associated with the management system 120 may be located on premises and other logic of the management system 120 may operate as a cloud-based service. This deployment may be utilized to satisfy data privacy requirements that may differ based on access, use and storage of sensitive information (e.g., personally identifiable information "PII") requirement for different geographical locations.

IV. Cluster Configuration Management

Figure 4:
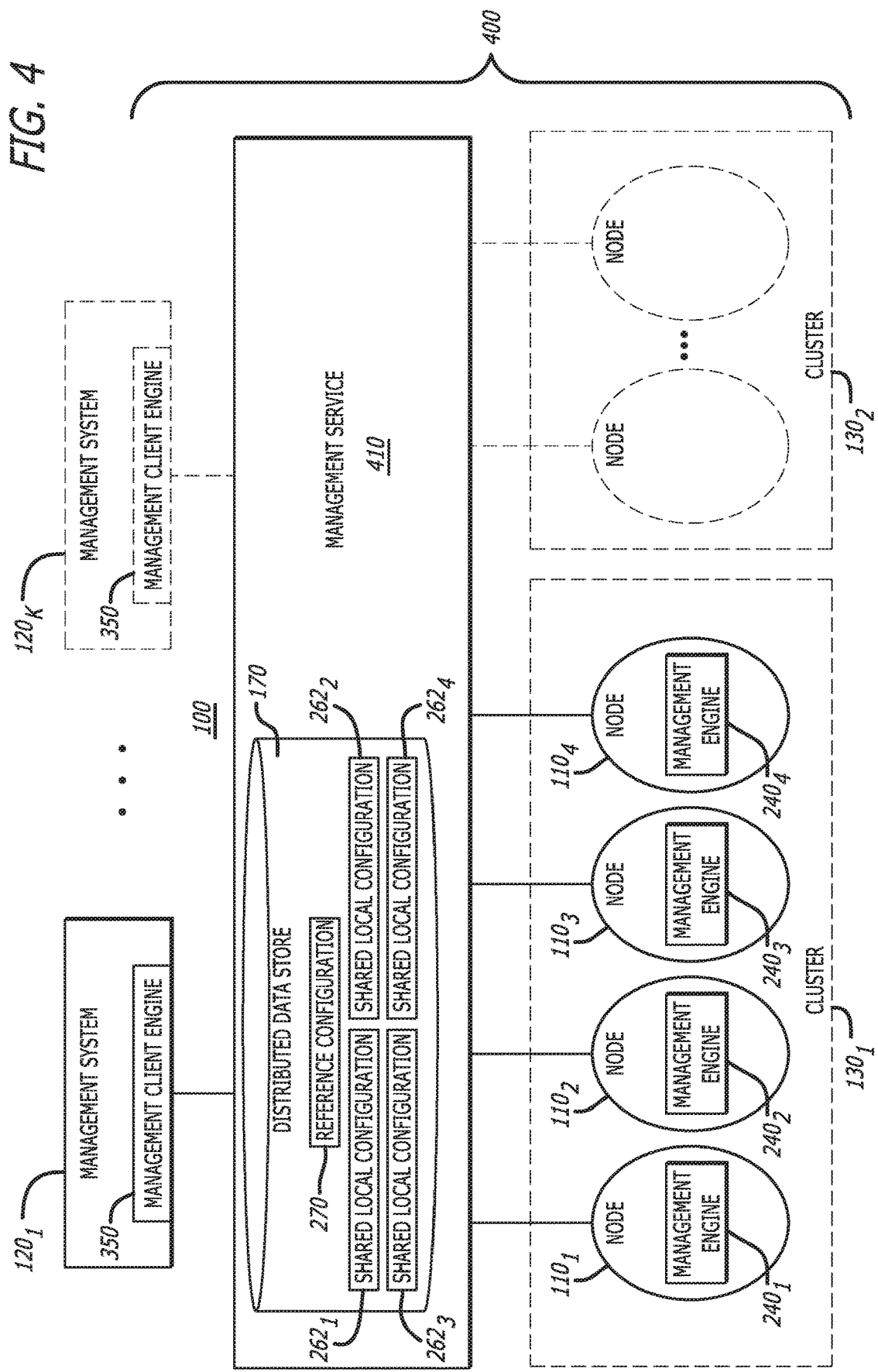
FIG. 4 is a logical representation of an exemplary embodiment of the cyber-threat detection system including the configuration management framework of FIG. 1.

Referring to FIG. 4, a logical representation of an exemplary embodiment of a configuration management framework 400 deployed within the cyber-threat detection system 100 of FIG. 1 is shown. Herein, a plurality of clusters $130_1$-$130_N$ may be configured in accordance with the distributed, configuration management framework 400. As shown, for this embodiment of the disclosure, the configuration management framework 400 includes a management service 410 for a first cluster $130_1$ and another management service 412 for a second cluster $130_2$, management engines $240_1$-$240_4$ deployed within corresponding computing nodes $110_1$-$110_4$, and a management client engine 350 (e.g., virtual or physical logic) deployed within the management system 120 or deployed within each of the multiple management systems as shown (hereinafter, "management system(s) $120_1$-$120_K$," where K≥1).

According to one embodiment of the disclosure, the configuration management framework 400 is designed so each computing node $110_1$-$110_4$ monitors and maintains compliance (e.g., consistency) between its shared local configuration $262_1$-$262_4$ and the reference (golden) configuration 270. Each shared local configuration $262_1$-$262_4$ partially controls operability of its computing nodes $110_1$-$110_4$, and the reference configuration 270 represented the expected configuration for each of the computing nodes within the same cluster. Additionally, the configuration management framework 400 further controls interoperability of the computing nodes $110_1$-$110_4$ by propagating modifications to the configuration data through each of the shared location configurations $262_1$-$262_4$ in response to updating the reference configuration 270 for example.

More specifically, the management service 410 supports communications between the computing nodes $110_1$-$110_4$ and one or more management system(s) $120_1$-$120_K$ in accordance with a selected messaging protocol. Similarly, management service 412 supports communications between the computing nodes within a second cluster $130_2$ and one or more management system(s) $120_1$-$120_K$. As shown, the management service 410 may utilize the distributed data store 170, where changes made to the reference configuration 270 maintained within the distributed data store 170 may cause such changes to be propagated to the computing nodes $110_1$-$110_4$ being part of the configuration management framework 400, although some of the computing nodes belonging to the cluster $130_1$ (not shown) may operate separately and their local configuration is not monitored.

As an illustrative example, in some situations, the first computing device $110_1$ may initiate a request to modify the reference configuration 270. This request may be initiated upon completion of a successful testing phase of a modified shared local configuration $262_1$, which has been permitted to be non-compliant with the reference configuration 270. Once the request has been authenticated (e.g., message relayed to a security administrator via the management system 120 to modify the reference configuration 270 has been approved), the first computing device $110_1$ modifies the reference configuration 270. The modification of the reference configuration 270 may be accomplished by overwriting a portion of the reference configuration 270 with the inconsistent configuration parameters or by overwriting the entire reference configuration 270 with the modified shared local configuration $262_1$ for example.

Upon completing the modification of the reference configuration 270, the shared local configurations $262_2$-$262_4$ of the computing nodes $110_2$-$110_4$ are now non-compliant (e.g., inconsistent) with the modified reference configuration 270. As a result, given that the computing nodes $110_2$-$110_4$ subscribe to the configuration management service, the modification of the reference configuration 270 prompts corresponding changes to the shared local configurations $262_2$-$262_4$ of the computing nodes $110_2$-$110_4$ to be made in order to remain compliant.

Additionally, each computing node $110_1$ ... $110_4$ includes a management engine $240_1$ ... $240_4$ being logic that monitors for compliance between the reference configuration 270 and each of the shared local configuration $262_1$-$262_4$ maintained on the computing nodes $110_1$ ... $110_4$. Upon detecting non-compliance between a shared local configuration (e.g., shared local configuration $262_2$) and the reference configuration 270 for example, the management engine (e.g., management engine $240_2$) updates that shared local configuration $262_2$ stored within the distribution data store 170 by including the differences between the shared local configurations $262_2$ and the reference configuration 270.

Periodically or aperiodically, at least one of the management system(s) $120_1$-$120_K$ polls the distributed data store 170 (or a configuration lead node) for the current state of one of more of the computing nodes $110_1$-$110_4$ to uncover differences between any of the shared local configurations $262_1$-$262_4$ and the reference configuration 270. Upon detecting non-compliance by any of the shared local configurations $262_1$-$262_4$, the management system(s) $120_1$-$120_K$ may generate a display accessible to a security administrator that identifies the non-compliance and allows the security administrator to initiate administrative controls that (i) temporarily ignore the non-compliance, (ii) prompt the reference configuration 270 to alter the non-compliant shared local configurations $262_1$ ... and/or $262_4$, or (iii) cause one of the computing nodes $110_1$-$110_4$ (e.g., computing node $110_4$) to initiate a leave command in efforts to remove the non-compliant, shared local configuration from the cluster $130_1$. This enables greater flexibility in more detailed analysis of the content.

Furthermore, upon receipt of data for updating the local configuration for each of the computing nodes $110_1$-$110_4$ (hereinafter, "local configuration update") to be shared between computing nodes within the cluster $130_1$, a management engine for the receiving computing node (e.g., management engine $240_2$ of the computing node $110_2$) propagates the data to its neighboring computing nodes (e.g., computing nodes $110_1$ and $110_3$. The "neighboring" computing nodes may be determined based, at least in part, on network coordinates or round-trip time with other computing nodes within the cluster. A "round-trip time" is a measured delay between transmission of a signal and return of a response signal from a responding computing node. A predetermined number of computing nodes with the lowest round-trip latency are considered to be the neighboring computing nodes for a particular computing node. The exchange occurs in an iterative manner, where the neighboring computing nodes may propagate the local configuration update.

Figure 5:
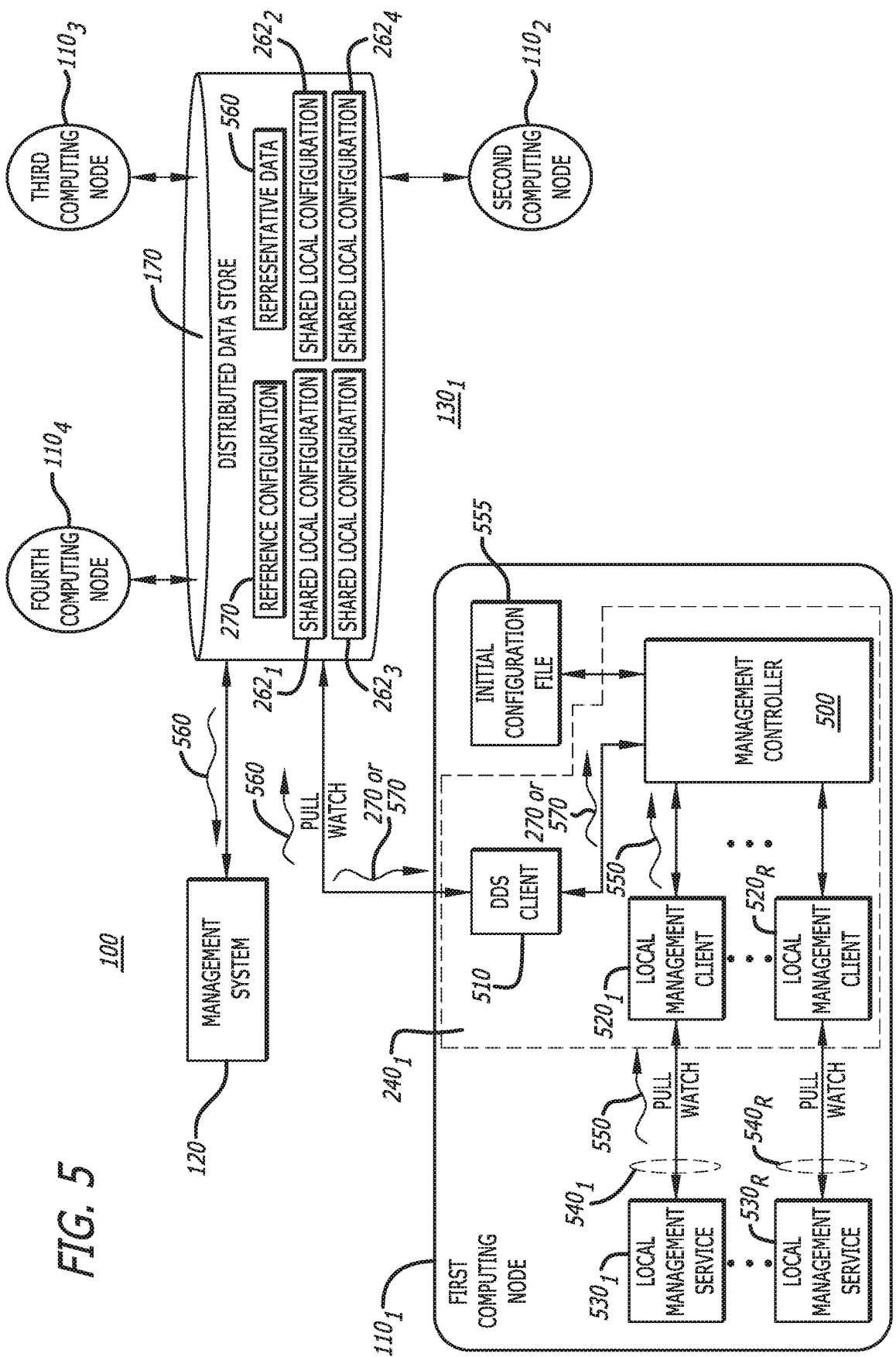
FIG. 5 is a logical representation of an exemplary embodiment of the configuration management framework provided by a cluster of the cyber-threat detection system of FIG. 1.

Referring now to FIG. 5, a logical representation of an exemplary embodiment of communications among components of the configuration management (system) framework 700 deployed within the cluster $130_1$ of FIG. 1 is shown. Herein, the cluster $130_1$ includes the computing nodes $110_1$-$110_4$ with the distributed data store 170. As shown, the distributed data store 170 maintains the shared local configurations $262_1$-$262_4$ for each of the computing nodes $110_1$-$110_4$ and the reference configuration 270. Additionally, each of the management engines $240_1$-$240_4$ within the computing nodes $110_1$-$110_4$ periodically or aperiodically evaluates whether its shared local configuration $262_1$-$262_4$ is compliant with the reference configuration 270. This evaluation is described below and operations of the management engine $240_1$ of the first computing node $110_1$ are illustrated in the logical representation of FIG. 5, although the management engines $240_2$-$240_4$ associated with the computing nodes $110_2$-$110_4$ within the cluster $130_1$ would perform similar operations concurrently with or at least independent from the configuration management described below.

As shown, the management engine $240_1$ of the first computing node $110_1$ includes a management controller 500, a distributed data store (DDS) client 510, and one or more local management clients $520_1$-$520_R$ (R≥1) that are designed to access configuration data from corresponding local management services $530_1$-$530_R$. More specifically, the local management services $530_1$-$530_R$ are services running on the first computing node $110_1$ that directed to operability of the first computing node $110_1$. Stated differently, each of the local management services $530_1$-$530_R$ may maintain (store) shared local configuration data in different forms: plain text file, relational database, customized database such as an operating system management database. For each type of the configuration form, the management system 120 uses a client to read, write, or receive notification about changes to configuration data. Read operations are being used by the client to monitor changes of the configuration values. For instance, a first local management service $530_1$ may be directed to database management being performed by the first computing node $110_1$ while a second local management service $530_8$ may be directed to file management being performed by the first computing node $110_1$.

According to one embodiment of the disclosure, each of these management services $530_1$-$530_R$ provides an API $540_1$-$540_R$ from which the corresponding local management clients $520_1$-$520_R$ may monitor for changes in shared local configuration data associated with these services. Upon detecting any changes in the shared local configuration data, such as a change to shared local configuration data associated with the first management services $530_1$ for example (hereinafter, "changed configuration data 550"), the local management clients $520_1$ provides the changed configuration data 550 to the management controller 500. For instance, the local management client $520_1$ may temporarily store the changed configuration data 550 until read by the management controller 500 during a polling operation. Alternatively, the local management client $520_1$ may "push" the changed configuration data 550 to the management controller 500. Herein, the initial configuration file 555 includes descriptions that identifies what properties of the shared local configuration (formed by local management services $530_1$-$530_R$) and/or the reference configuration 270 should be monitored.

The management controller 500 compares the changed configuration data 550 to a portion of the reference configuration 270, which is received from the distributed data store 170 via the DDS client 510. In the event that the changed configuration data 550 is inconsistent with the portion of the reference configuration 270, rendering the shared local configuration data $262_1$ non-compliant with the reference configuration 270, the management controller 500 may be configured to address this non-compliance in accordance with any number of configuration enforcement schemes. For instance, according to one embodiment of the disclosure, the management controller 500 may be configured to automatically return the shared local configuration data $262_1$ back to its prior state upon detecting that it is non-compliant with the current reference configuration 270. Alternatively, the management controller 500 may mark the first computing node $110_1$ as not healthy, so the node $110_1$ will not be used for processing, or the node $110_1$ could be detached from the cluster.

Alternatively, the management controller 500 may be configured to perform operations a security administrator to address the configuration violation, which may include providing recommendations or reporting on remedial actions via an administrative portal or transmitted alert. Herein, the management controller 500 may generate representative data 560 of the non-compliance and upload the representative data 560 for storage with the shared local configuration data $262_1$ in the distributed data store 170. Upon monitoring the distributed data store 170, the management system 120 detects a change in the shared local configuration data $262_1$ (i.e., the addition of the representative data 560) and reports the configuration violation to a security administrator that determines how to proceed. The security administrator may return a message instructing the management system 120 to signal the management controller 500 to (i) ignore the inconsistent shared local configuration data $262_1$ for now, (ii) return the changed configuration data 550 back to its prior state in compliance with the reference configuration 270, or (iii) alter the reference configuration 270 with the changed configuration data 550.

According to another embodiment of the disclosure, the management system 120 may alter the reference configuration 270. The DDS client 510 is configured to monitor the distributed data store 170, notably the reference configuration 270, for changes. Upon detecting changes in data associated with the reference configuration 270 (hereinafter, "changed reference configuration data 570"), the DDS client $510_1$ provides the changed reference configuration data 570 to the management controller 500. For instance, the DDS client 510 may temporarily store the changed reference configuration data 570 until read by the management controller 500 during a polling operation. Alternatively, the DDS client $510_1$ may "push" the changed reference configuration data 570 to the management controller 500.

Figure 6A:
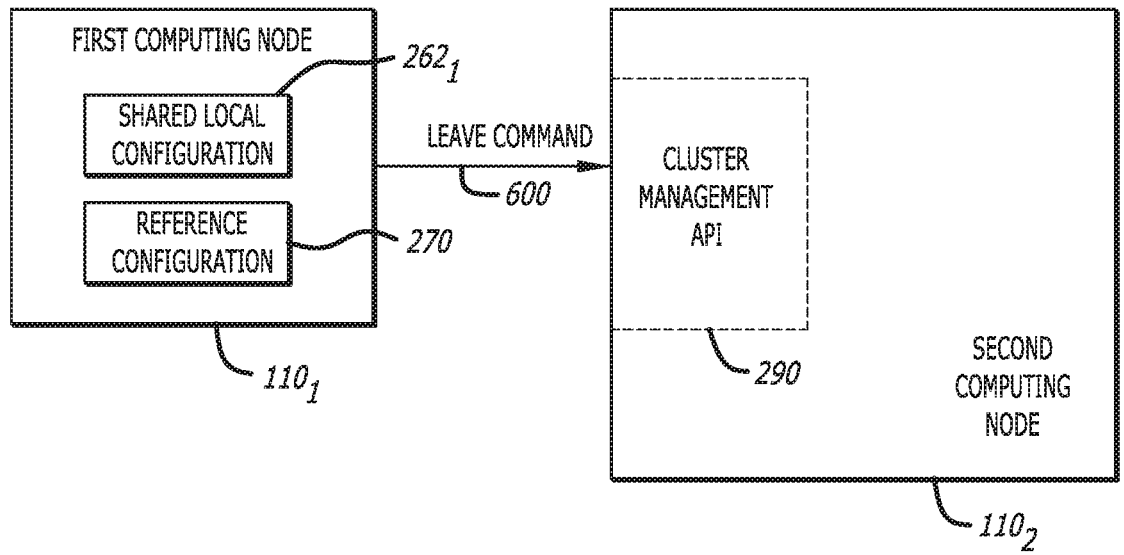
FIG. 6A is a block diagram of a first exemplary embodiment of the cluster formation scheme directed to removal of a requesting computing node from a cluster.
Figure 6B:
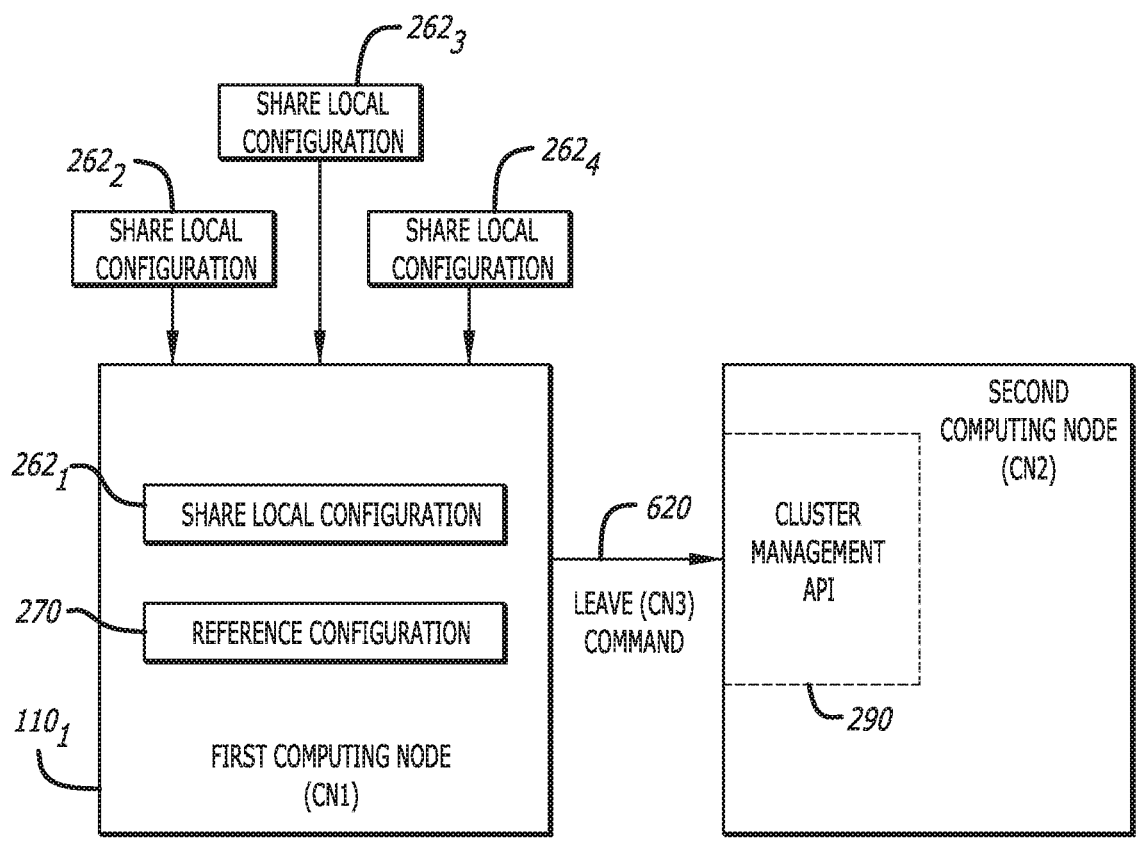
FIG. 6B is a block diagram of a second exemplary embodiment of the cluster formation scheme directed to removal of a computing node based on an initiated command by a different computing node.

The management controller 500 compares the changed reference configuration data 570 to the shared local configuration data $262_1$, which is gathered from the local management service $530_1$-$530_R$ by the local management clients $520_1$-$520_R$. Upon detecting that the shared local configuration data $262_1$ is non-compliant with the reference configuration 270, the management controller 500 may be configured to alter the shared local configuration data $262_1$ to be consistent with the reference configuration 270 as one type of remedial action (remediation). Another remedial action, where ease and/or timeliness in dealing with the misconfiguration of a computing node is a primary concern, may cause the computing node to leave the cluster, as illustrated in FIGS. 6A-6B. Removal of the computing node may be initiate by command (while the computing node is healthy or addressing a misconfigured computing node) or upon request of the misconfigured computing node.

Referring now to FIG. 6A, a block diagram of an exemplary embodiment of the cluster formation in which a particular computing node (e.g., first computing node $110_1$) leaves the cluster $130_1$ is shown. For this embodiment, to leave the cluster $130_1$, the first computing node $110_1$ may issue a leave command 600 to the cluster management API 290, which may be provided by another computing node within the cluster $130_1$ (e.g., second computing node $110_2$) operating as a proxy to cluster-wide services provided by the cluster $130_1$. The issuance of the leave command 600 by the first computing node $110_1$ may be based on non-compliance (e.g., inconsistency) between the shared local configuration $262_1$ of the first computing node $110_1$ and the reference configuration 270, where the shared local configuration $262_1$ may requires immediate removal or more in-depth analysis before being placed into compliance with the reference configuration 270 (e.g., more requisite time needed than allotted to cure non-compliance, potential tampering of the provisioning of the first computing node $110_1$, etc.). As a result, in response to the leave command 600 from the first computing node $110_1$, the cluster management API 290 will remove the IP address of the first computing node $110_1$ from its listing of computing nodes forming the first cluster $130_1$ and the first computing node $110_1$ will cause removal of the shared local configuration data $262_1$ from the distributed data store 170.

Referring now to FIG. 6B, a block diagram of an exemplary embodiment of the cluster formation controlled by the first computing node $110_1$, operating as the configuration lead node, in causing another computing node (e.g., third computing node $110_3$) to leave the cluster $130_1$ is shown. As described, each computing node (e.g., computing node $110_1$) may acquire the shared local configurations $262_2$, $262_3$ and $262_4$ associated with each corresponding computing node $110_2$, $110_3$, and $110_4$ within its cluster $130_1$. As a result, the first computing node $110_1$ is able to (i) identify non-compliance (e.g., inconsistency) between configuration data associated with a shared local configuration $262_2$, $262_3$ or $262_4$ (e.g., shared local configuration $262_3$) and configuration data of the reference configuration 270. In some cases, the uncovered non-compliance may signify that the third computing node $110_3$ is non-responsive (e.g., failed), which may cause the first computing node $130_1$ may generate the leave command 620. Unlike the leave command 600 of FIG. 6A, the leave command 620 would identify the third computing node $110_3$ as the entity to be removed from the cluster $130_1$.

As a result, in response to the leave command 620 from the first computing node $110_1$, the cluster management API 290 will remove the IP address of the third computing node $110_3$ from its listing of computing nodes forming the first cluster $130_1$ and the first computing node $110_1$ will cause removal of the shared local configuration data $262_3$ of the third computing node $110_3$ from the distributed data store 170.

Figure 7:
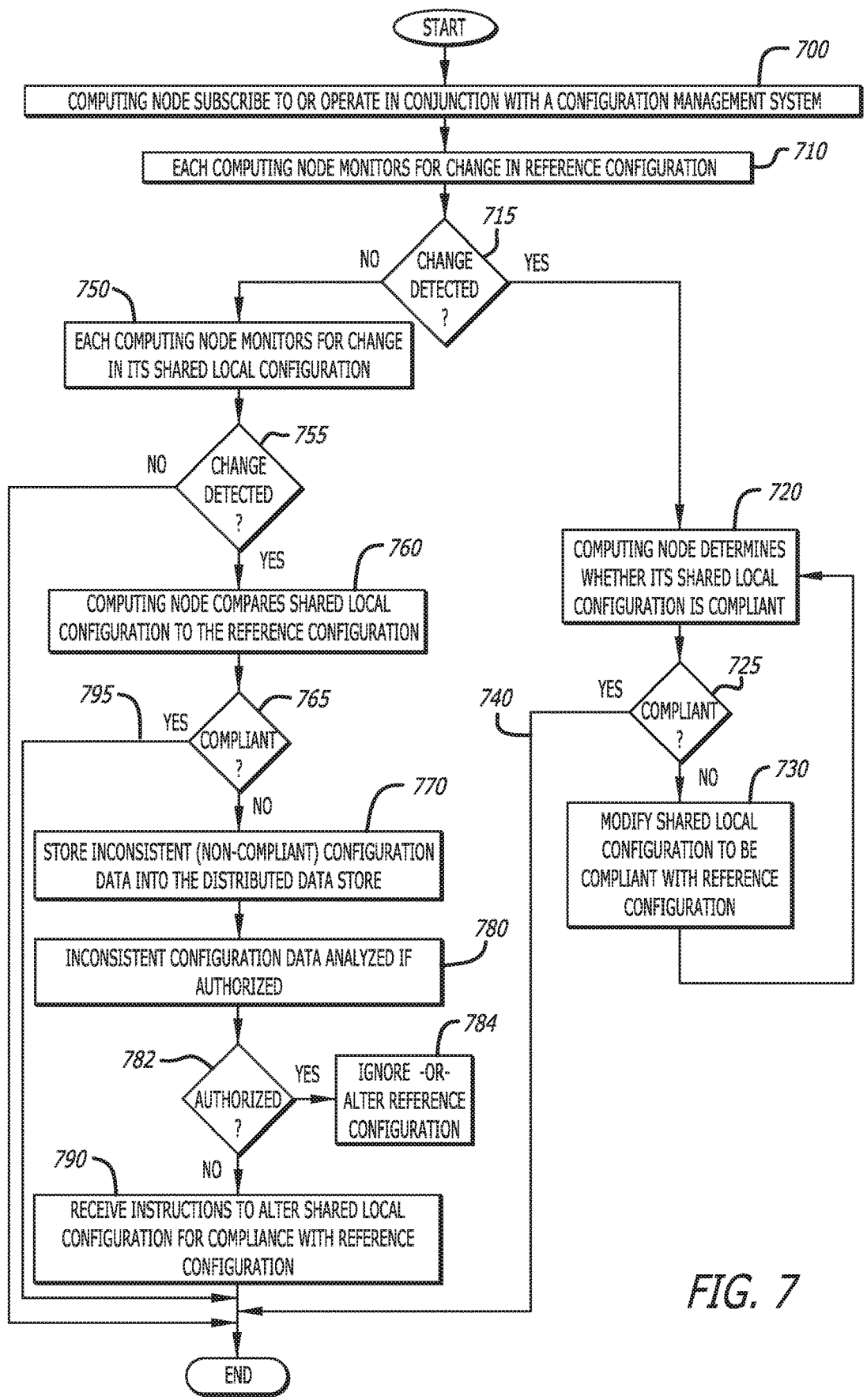
FIG. 7 is a flow diagram of the operations conducted by the configuration management framework of FIG. 1.

Referring to FIG. 7, a flow diagram of the operations conducted by the configuration management system of FIG. 5 is shown. Herein, one or more computing nodes within a cluster subscribes to or operates in conjunction with a configuration management service (item 700). Each of the computing nodes (e.g., management service engine within) monitors for a change in the reference configuration (items 710 and 715). Responsive to detection of an authorized change in the reference configuration, each of the computing nodes determines whether its shared local configuration is compliant with the reference configuration (items 720-725). Such a determination may involve a management controller within each computing node comparing configuration data within the reference configuration to corresponding configuration data within its shared local configuration. For each computing node, if the shared local configuration is non-compliant (e.g., inconsistent) with the reference configuration, the management controller modifies the shared local configuration to be compliant with the reference configuration (item 730). If the shared local configuration is compliant with the reference configuration, the configuration management analysis ends (item 740).

Additionally, or in the alternative, each of the computing nodes monitors for changes in its corresponding shared local configuration (items 750-755). Responsive to detection of a change in the shared local configuration within one of the computing nodes (hereinafter, "detecting computing node"), the management controller within the detecting computing node compares the configuration data within the shared local configuration to corresponding configuration data within the reference configuration (items 760-765). If the shared local configuration is non-compliant with the reference configuration, the management controller stores the inconsistent configuration data into the distributed data store to be accessed by the management system (item 770).

Thereafter, if the change to the shared local configuration is authorized, the management controller may receive instructions to (i) ignore alteration of the changed shared local configuration data at this time or (ii) alter the reference configuration with the changed shared local configuration data (items 780, 782, 784). If the change is unauthorized or no update to the reference configuration is desired, the management controller of the non-compliant computing node may receive instructions to alter the shared local configuration data and return the changed shared local configuration data back to its prior state and in compliance with the reference configuration (item 790). If the shared local configuration is in compliance with the reference configuration, the configuration management analysis ends (item 795).

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A computing node deployed within a cluster including a data store maintaining at least a reference configuration representing an expected configuration for each computing node within the cluster, the computing node comprising:
   one or more processors;
   a memory communicatively coupled to the one or more processors, the memory comprises
      a first client that, when executed by the one or more processors, is configured to obtain data associated with the reference configuration,
      a second client that, when executed by the one or more processors, is configured to obtain data associated with a shared local configuration for the computing node maintained within a first local management service via an application programming interface (API) provided by the first local management service, wherein the data associated with the shared local configuration corresponds to a first portion of local configuration data that is associated with functionality commonly shared by a plurality of computing nodes forming the cluster and is separate from private local configuration data, the private local configuration data, corresponding to a second portion of the local configuration data, pertains to functionality specific to the computing node, the plurality of computing nodes comprises the computing node, and
      a management controller that, when executed by the one or more processors, is configured to detect when the shared local configuration is non-compliant with the reference configuration and notify an administrator upon detecting that the shared local configuration is non-compliant with the reference configuration,
      wherein the shared local configuration is non-compliant with the reference configuration when a difference between data associated with a property maintained as part of the shared local configuration and the data associated with a property maintained as part of the reference configuration exceeds a tolerance based on the property type.

2. The computing node of claim 1, wherein the first client is configured to monitor the data store for changes to the reference configuration and the second client is configured to monitor for changes to the shared local configuration.

3. The computing node of claim 2, wherein the data associated with the reference configuration is obtained from the data store.

4. The computing node of claim 2, wherein the management controller is configured to notify the administrator upon detecting that a portion of the data associated with the shared local configuration is non-compliant with a corresponding portion of the data associated with the reference configuration by at least uploading the portion of the data associated with the shared local configuration into the data store for subsequent access and analysis by the administrator.

5. The computing node of claim 2, wherein the second client, when executed by the one or more processors, obtains the data associated with the shared local configuration from one or more local management services running on the computing node.

6. The computing node of claim 5, wherein the second client, being a local management client, accesses the API provided by the first local management service of the one or more local management services to obtain a portion of the data associated with the shared local configuration to analyze for inconsistencies with a corresponding portion of the data associated with the reference configuration.

7. The computing node of claim 1, wherein the first client monitors for changes in the reference configuration stored within the data store and the second client monitors for changes in the local management services running on the computing node.

8. The computing node of claim 1, wherein the first client, when executed by the one or more processors, is further configured to obtain data associated with shared local configurations associated with a second computing node different than the computing node.

9. The computing node of claim 8, wherein the management controller, when executed by the one or more processors, is further configured to detect when the shared local configuration of the second computing node is non-compliant with the reference configuration and notify the administrator upon detecting that the shared local configuration of the second computing node is non-compliant with the reference configuration.

10. The computing node of claim 1, wherein the tolerance allows for prescribed differences between data associated with the property maintained as part of the shared local configuration and the data associated with the property maintained as part of the reference configuration.

11. A system for maintaining node configuration consistency throughout a cluster configured for cyber-threat detection, the system comprising:
   a data store for storage of at least data associated with a reference configuration;
   a management system communicatively coupled to the data store; and
   one or more computing nodes communicatively coupled to the data store, the one or more computing nodes including a first computing node that comprises a management engine configured to (i) obtain the data associated with the reference configuration from the data store, (ii) obtain a first portion of shared local configuration data for the first computing node maintained within a first local management service via an application programming interface (API) provided by the first local management service, (iii) detect when the first portion of the shared local configuration data is non-compliant with the data associated with the reference configuration, and (iv) upload information associated with the non-compliant data associated with the first portion of the shared local configuration data into the data store,
   wherein the first computing node is configured to remove itself from the cluster based on the first portion of the shared local configuration data being non-compliant with the data associated with the reference configuration.

12. The system of claim 11, wherein
   the first computing node maintains local configuration data including the shared local configuration data being a first portion of the local configuration data associated with functionality shared by the one or more computing nodes and a second portion of the local configuration data associated functionality specific to a particular computing node of the one or more computing nodes, and
   the management system further to provide the first computing node with administrative controls to modify the shared local configuration data to be compliant with the data associated with the reference configuration.

13. The system of claim 11, wherein
   the first computing node maintains local configuration data including the shared local configuration data being a first portion of the local configuration data associated with functionality shared by the one or more computing nodes and a second portion of the local configuration data associated functionality specific to a particular computing node of the one or more computing nodes, and
   the management engine of the first computing node to monitor the data store for changes to the data associated with the reference configuration and to monitor for changes to the shared local configuration data.

14. The system of claim 13, wherein the management engine of the first computing node is configured to notify the administrator upon detecting that the first portion of the shared local configuration data is non-compliant with the data associated with the reference configuration by at least uploading the first portion of the shared local configuration data into the data store for subsequent access and analysis by the administrator.

15. The system of claim 11, wherein the management engine of the first computing node to monitor for changes in the data associated with the reference configuration stored within the data store and monitor for changes in local management services, including the first local management service, running on the first computing node.

16. The system of claim 11, wherein the management engine of the first computing node is further configured to obtain a second portion of the data associated with shared local configuration data associated with a second computing node different than the first computing node.

17. The system of claim 11, wherein the management engine to detect when the shared local configuration data is non-compliant with the data associated with the reference configuration when data associated with a property maintained as part of the shared local configuration data is different than the data associated with a property maintained as part of the reference configuration.

18. The system of claim 11, wherein the management system is deployed as a cloud service in which the shared local configuration data being the first portion of the local configuration data associated with functionality shared by the one or more computing nodes with access to the cloud service.

19. The system of claim 18, wherein the one or more computing nodes are deployed within a public cloud including the management system operating as the cloud service.

20. The system of claim 11, wherein the first computing node, upon detecting a configuration violation in which the shared local configuration data is non-compliant with the data associated with the reference configuration, uploading the information by making the shared local configuration data available to the administrator via a portal.

21. The system of claim 20, wherein the configuration violation is handled by an automated system relying on preconfigured rule sets, one or more machine learning models, or an artificial neural network.

22. The system of claim 20, wherein the configuration violation is through a remediation using repair instructions to return the shared local configuration back to a prior state that is in compliance with the reference configuration.

23. The system of claim 20, wherein the particular computing node corresponds to the first computing node.

24. A computerized method for monitoring local configurations of computing nodes forming a cluster including a plurality of computing nodes that are configured to collectively perform cyber-threat detection analytics on received objects to determine if the received objects are malicious or non-malicious, the computerized method comprising:
   obtaining data associated with a reference configuration;
   obtaining data associated with a shared local configuration for a computing node of the plurality of computing modes forming the cluster, wherein (i) the data associated with the shared local configuration is maintained within a first local management service accessible via an application programming interface (API) provided by the first local management service and (ii) the shared local configuration corresponds to a first portion of local configuration data associated with functionality shared by the plurality of computing nodes including the computing node while a private local configuration corresponding to a second portion of the local configuration data pertains to functionality specific to the computing node,
   detecting when the shared local configuration is non-compliant with the reference configuration; and
   notifying an administrator upon detecting that the shared local configuration is non-compliant with the reference configuration.

25. The computerized method of claim 24, wherein the computing node is configured to monitor for changes to the shared local configuration and obtain the data associated with the shared local configuration and the data associated with the reference configuration responsive to a change to the shared local configuration.

26. The computerized method of claim 25, wherein the data associated with the reference configuration is obtained from the data store.

27. The computerized method of claim 24, wherein the notifying of the administrator upon detecting that a portion of the data associated with the shared local configuration is non-compliant with a corresponding portion of the data associated with the reference configuration by at least uploading the portion of the data associated with the shared local configuration into a data store for subsequent access and analysis by the administrator.

28. The computerized method of claim 24, wherein the detecting whether the shared local configuration is non-compliant with the reference configuration is conducted within a public cloud network.

29. The computerized method of claim 28, wherein the obtaining of the data associated with the shared local configuration for the computing node of the cluster further comprising obtaining shared local configuration from each of the plurality of computer nodes of the cluster other than the computing node, wherein the shared local configuration corresponds to data associated with functionality shared by the plurality of computing nodes operating in the public cloud network.

30. The computerized method of claim 28, wherein the obtaining of the data associated with the shared local configuration for the computing node of the cluster further comprising obtaining shared local configuration from each of the plurality of computer nodes of the cluster other than the computing node, wherein the shared local configuration corresponds to data associated with functionality shared by the plurality of computing nodes accessing the management system deployed within the public cloud network.

31. The computerized method of claim 24, wherein the notifying of the administrator, upon detecting a configuration violation in which the shared local configuration is non-compliant, comprises providing access to the shared local configuration via a portal.

32. The computerized method of claim 31, wherein the configuration violation is handled by an automated system relying on preconfigured rule sets, one or more machine learning models, or an artificial neural network.

33. The system of claim 31, wherein the configuration violation is handled through a remediation using repair instructions to return the shared local configuration back to a prior state that is in compliance with the reference configuration.

* * * * *